(12) United States Patent
Lee et al.

(10) Patent No.: US 12,334,641 B2
(45) Date of Patent: Jun. 17, 2025

(54) ANTENNA STRUCTURE AND ELECTRONIC DEVICE INCLUDING THE SAME

(71) Applicant: SAMSUNG ELECTRONICS CO., LTD., Suwon-si (KR)

(72) Inventors: Seokmin Lee, Suwon-si (KR); Junsig Kum, Suwon-si (KR); Yoongeon Kim, Suwon-si (KR); Seungho Choi, Suwon-si (KR); Seungtae Ko, Suwon-si (KR); Youngju Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 81 days.

(21) Appl. No.: 18/108,948

(22) Filed: Feb. 13, 2023

(65) Prior Publication Data
US 2023/0187845 A1   Jun. 15, 2023

Related U.S. Application Data

(63) Continuation of application No. PCT/KR2022/003795, filed on Mar. 18, 2022.

(30) Foreign Application Priority Data

Mar. 19, 2021   (KR) .................. 10-2021-0036259

(51) Int. Cl.
*H01Q 21/06*   (2006.01)
*H01Q 1/24*   (2006.01)
(Continued)

(52) U.S. Cl.
CPC ........... *H01Q 21/065* (2013.01); *H01Q 1/246* (2013.01); *H01Q 1/52* (2013.01); *H01Q 9/045* (2013.01)

(58) Field of Classification Search
CPC ........ H01Q 21/065; H01Q 1/246; H01Q 1/52; H01Q 9/045; H01Q 1/243; H01Q 21/24;
(Continued)

(56) References Cited

U.S. PATENT DOCUMENTS 6,025,554 A * 2/2000 Macris .................. H10N 10/17
136/203
6,144,344 A * 11/2000 Kim ....................... H01Q 21/10
343/789
(Continued)

FOREIGN PATENT DOCUMENTS

CN   107425275   12/2017
CN   109103605   12/2018
(Continued)

OTHER PUBLICATIONS

[Online] Park et al., "Analysis of on the Microstrip Patch Antennas with Air Layers in Dielectric Layer", http://www.dbpia.co.kr/journal/articalDetail?nodeID=NODE00813262, Proceedings of KIIT Conference, Aug. 2004, pp. 149-153 (5 pages).
(Continued)

*Primary Examiner* — Hai V Tran
*Assistant Examiner* — Jordan E. DeWitt
(74) *Attorney, Agent, or Firm* — Nixon & Vanderhye P.C.

(57) ABSTRACT

The disclosure relates to a pre-$5^{th}$-Generation (5G) or 5G communication system to be provided for supporting higher data rates Beyond $4^{th}$-Generation (4G) communication system such as Long Term Evolution (LTE). According to an embodiment of the disclosure, an antenna structure of a wireless communication system may include: at least one antenna element including at least one antenna, a power divider configured to feed the at least one antenna element, and a substrate, the at least one antenna element and the power divider may be disposed on the substrate, and, the
(Continued)

substrate may include a first dielectric layer having an air layer in a region corresponding to a first region in which the power divider is disposed on the substrate, and a second dielectric layer disposed between the first dielectric layer and the power divider.

20 Claims, 13 Drawing Sheets

(51) Int. Cl.
*H01Q 1/52* (2006.01)
*H01Q 9/04* (2006.01)

(58) Field of Classification Search
CPC ........ H01Q 21/28; H01Q 1/38; H01Q 9/0485; H01P 5/12; H01P 3/084; H01P 5/04; H01P 5/16; H04B 7/0413
See application file for complete search history.

(56) References Cited

U.S. PATENT DOCUMENTS

| | | | | |
|---|---|---|---|---|
| 6,307,509 B1* | 10/2001 | Krantz | ................ | H01Q 9/0407 343/700 MS |
| 8,068,796 B2* | 11/2011 | Wu | ................ | H01P 5/187 455/333 |
| 9,570,814 B2* | 2/2017 | Ando | ................ | H01Q 21/061 |
| 10,594,037 B1* | 3/2020 | Wu | ................ | H01Q 9/0457 |
| 11,342,665 B1* | 5/2022 | Reuveni | ............ | H01Q 1/2283 |
| 2003/0020173 A1* | 1/2003 | Huff | ................ | H01G 5/16 257/774 |
| 2003/0020655 A1* | 1/2003 | McKinzie, III | ......... | H01Q 1/38 343/909 |
| 2004/0048420 A1* | 3/2004 | Miller | ................ | H01P 3/084 438/106 |
| 2004/0061647 A1* | 4/2004 | Roper | ................ | H01Q 9/0457 343/700 MS |
| 2005/0264452 A1* | 12/2005 | Fujishima | ............ | H01Q 9/0407 343/700 MS |
| 2008/0297417 A1* | 12/2008 | Austin | ................ | H01Q 1/38 343/700 MS |
| 2009/0009399 A1* | 1/2009 | Gaucher | ............ | H01Q 21/0075 343/700 MS |
| 2009/0051467 A1* | 2/2009 | McKinzie, III | ......... | H01P 1/16 333/219 |
| 2011/0043301 A1* | 2/2011 | Huettner | ................ | H01P 5/16 333/136 |
| 2011/0156946 A1* | 6/2011 | Margomenos | ......... | G01S 7/032 342/175 |
| 2011/0254746 A1 | 10/2011 | Park et al. | | |
| 2013/0044035 A1* | 2/2013 | Zhuang | ................ | H01Q 9/0428 343/770 |
| 2014/0028524 A1* | 1/2014 | Jerauld | ................ | H01Q 1/52 343/893 |
| 2015/0194724 A1* | 7/2015 | Yepes | ................ | H01Q 9/0407 343/702 |
| 2016/0049723 A1* | 2/2016 | Baks | ................ | H01Q 9/0457 343/848 |
| 2017/0054217 A1* | 2/2017 | Hashimoto | ......... | H01Q 9/0457 |
| 2018/0090852 A1* | 3/2018 | Dufilie | ................ | H01Q 1/38 |
| 2018/0247905 A1* | 8/2018 | Yu | ................ | H01L 21/6835 |
| 2019/0131706 A1* | 5/2019 | Raney | ................ | H01Q 21/0075 |
| 2019/0131721 A1* | 5/2019 | Dani | ................ | H01Q 21/24 |
| 2019/0252783 A1* | 8/2019 | Liu | ................ | H01L 24/19 |
| 2019/0326672 A1* | 10/2019 | Lim | ................ | H01Q 19/30 |
| 2020/0091608 A1* | 3/2020 | Alpman | ................ | H01Q 1/48 |
| 2020/0343648 A1* | 10/2020 | Tehran | ................ | H01Q 1/24 |
| 2021/0091470 A1* | 3/2021 | Ahmadloo | ......... | H01Q 13/206 |
| 2021/0194149 A1* | 6/2021 | Hiramatsu | ............ | H01Q 5/378 |
| 2021/0257739 A1* | 8/2021 | Mathews | ............ | H01Q 1/2283 |
| 2021/0313694 A1* | 10/2021 | Lim | ................ | H01Q 1/2283 |
| 2022/0045413 A1* | 2/2022 | Jia | ................ | H01P 1/2039 |
| 2022/0263221 A1* | 8/2022 | Ke | ................ | H01L 23/5389 |
| 2022/0285844 A1* | 9/2022 | Gupta | ................ | H01Q 9/0457 |
| 2023/0187845 A1* | 6/2023 | Lee | ................ | H01Q 21/28 343/893 |
| 2023/0231296 A1* | 7/2023 | Lee | ................ | H01Q 21/0087 343/702 |

FOREIGN PATENT DOCUMENTS

| | | | | |
|---|---|---|---|---|
| CN | 111638813 | | 9/2020 | |
| JP | 6-6130 | | 1/1994 | |
| JP | 8-167812 | | 6/1996 | |
| KR | 1999-0052552 | | 7/1999 | |
| KR | 10-2009-0020878 | | 2/2009 | |
| KR | 10-2010-0137686 | | 12/2010 | |
| KR | 10-2011-0048178 | | 5/2011 | |
| KR | 10-1664389 | | 10/2016 | |
| KR | 10-2019-0010991 | | 2/2019 | |
| KR | 10-2021-0027936 | | 3/2021 | |
| WO | WO-2013007280 A1 * | 1/2013 | ........... | H01Q 1/2225 |
| WO | 2020/251062 | | 12/2020 | |
| WO | WO-2022060170 A1 * | 3/2022 | ............... | H01Q 1/12 |
| WO | WO-2023059050 A1 * | 4/2023 | ............... | H01P 1/20 |
| WO | WO-2024243981 A1 * | 12/2024 | | |

OTHER PUBLICATIONS

[Online] Lee et al., "A Study on Characteristics of Triple-band Plastic Chip Antenna for Mobile Terminal using Foamex Materials", http: /www.dbpia.co.kr/journal/articleDetail?nodeId= NODE02249454, Journal of the Korea Institute of Information and Communication Engineering, 11(12), Dec. 2007, pp. 2210-2216 (7 pages).
International Search Report for PCT/KR2022/003795 mailed Jul. 12, 2022, 6 pages.
Written Opinion of the ISA for PCT/KR2022/003795 mailed Jul. 12, 2022, 4 pages.
Extended European Search Report dated Jun. 25, 2024 issued in European Patent Application No. 22771807.9.
Korean Office Action dated Apr. 26, 2025 for KR Application No. 10-2021-0036259.

* cited by examiner (710)

(720)

(730)

(740)

(750)

(760)

(770)

(780)

ANTENNA STRUCTURE AND ELECTRONIC DEVICE INCLUDING THE SAME

CROSS-REFERENCE TO RELATED APPLICATIONS

This application is a continuation of International Application No. PCT/KR2022/003795 designating the United States, filed on Mar. 18, 2022, in the Korean Intellectual Property Receiving Office and claiming priority to Korean Patent Application No. 10-2021-0036259, filed on Mar. 19, 2021, in the Korean Intellectual Property Office, the disclosures of which are incorporated by reference herein in their entireties.

BACKGROUND

Field

The disclosure relates to a wireless communication system and, for example, to an antenna structure and an electronic device including the same in a wireless communication system.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G system, an electronic device includes multiple antenna elements. One or more antenna elements form a sub array. In addition, the electronic device includes a power divider for supplying power to the one or more antenna elements included in the sub array. In line with the increasing number of antenna elements required for beamforming, it is required to design electronic devices in more effective structures in view of the antenna structure production cost and radiation performance.

SUMMARY

Embodiments of the disclosure provide a structure of a substrate including an air layer in a region in which a power divider for antenna feeding is disposed in a wireless communication system.

Embodiments of the disclosure provide an antenna structure capable of minimizing and/or reducing the production cost and improving the radiation performance using a substrate including an air layer in a wireless communication system.

According to various example embodiments of the disclosure, an antenna structure of a wireless communication system may include: at least one antenna element including an antenna, a power divider configured to feed the at least one antenna element, and a substrate, wherein the at least one antenna element and the power divider are disposed on the substrate, and the substrate includes a first dielectric layer having a first region in which the power divider is disposed, an air layer corresponding to the first region, and a second dielectric layer disposed between the first dielectric layer and the power divider.

According to various example embodiments of the disclosure, a massive multiple input multiple output (MIMO) unit (MMU) device may include: a main printed circuit board (PCB), a radio frequency integrated circuit (RFIC) disposed on the main PCB, an antenna PCB disposed on the main PCB, a plurality of antenna elements including at least one antenna, and a power divider configured to feed the plurality of antenna elements, wherein the plurality of antenna elements and the power divider are disposed on the antenna PCB, and the antenna PCB includes a first dielectric layer having a first region in which the power divider is disposed on the antenna PCB, an air layer corresponding to the first region, and a second dielectric layer disposed between the first dielectric layer and the power divider.

A device according to various example embodiments of the disclosure makes it possible to fabricate an antenna structure at an efficient cost through a substrate structure including an air layer in a region in which a power divider is disposed.

A device according to various example embodiments of the disclosure may minimize and/or reduce dielectric loss, through a substrate structure including an air layer, thereby improving the radiation performance.

Advantageous effects obtainable through the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

The terms used in the disclosure are used to describe various example embodiments, and are not intended to limit the disclosure. A singular expression may include a plural expression unless they are different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various example embodiments of the disclosure will be described based on an approach of hardware. However, various embodiments of the disclosure include a technology that uses both hardware and software, and thus the various embodiments of the disclosure may not exclude the perspective of software.

Terms (a substrate, a printed circuit board (PCB), a board, a line, a transmission line, a feeding line, a power divider, an antenna, antenna array, sub array, an antenna element, a feeding unit, a feeding point, etc.) referring to components of a device, terms (a rib and a hole, etc.) referring to shapes of the components, and the like, which are used in the following description, are for convenience of the description. Therefore, the disclosure is not limited to the terms described below.

In addition, the disclosure provides various embodiments described using terms which are used in some communication standards (e.g., 3$^{rd}$ Generation Partnership Project (3GPP)), but the terms are only examples for description. Various embodiments of the disclosure may be easily modified and applied in other communication systems.

Figure 1:
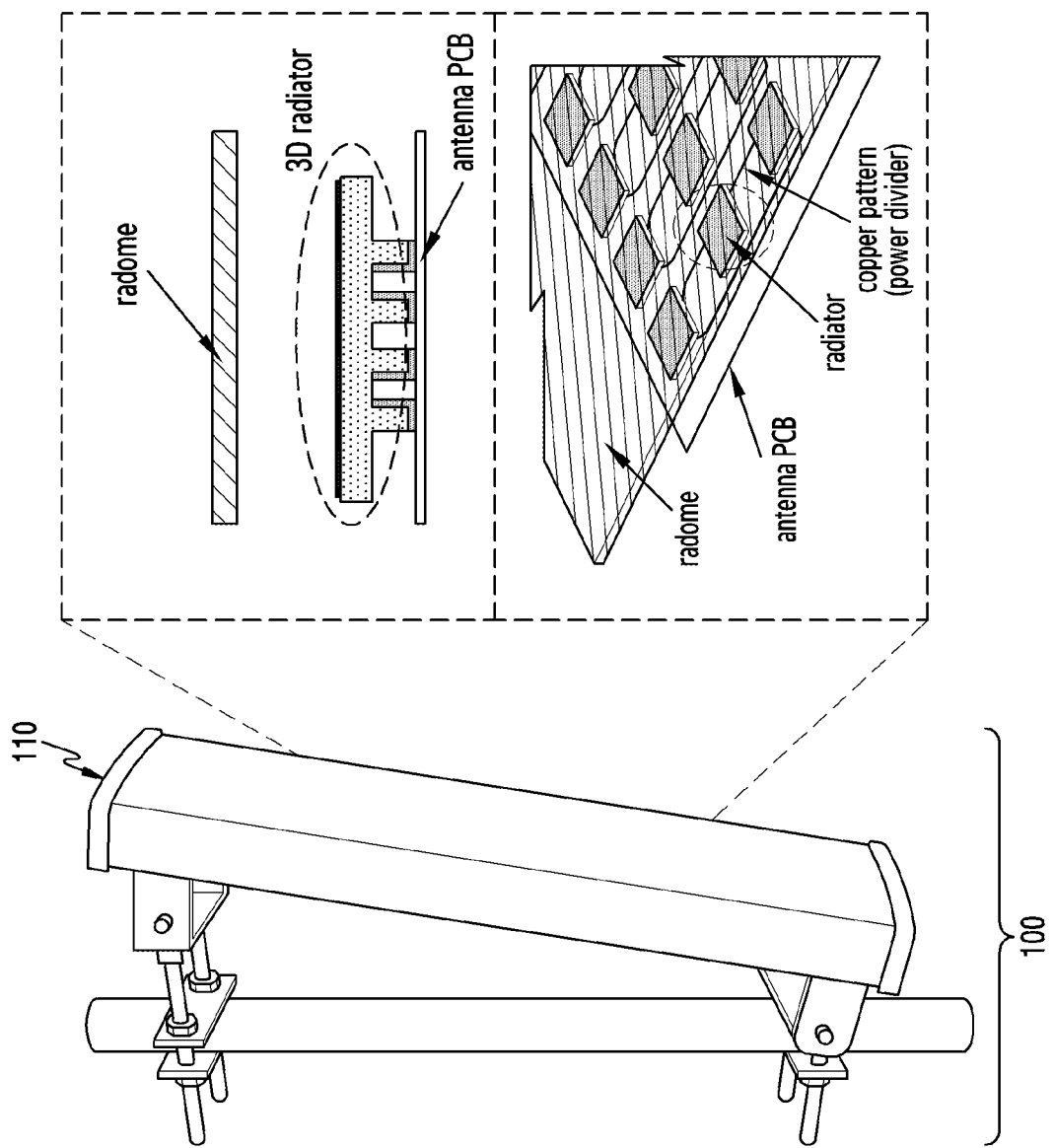
FIG. 1 is a diagram illustrating an example configuration of a massive multiple input multiple output (MIMO) unit (MMU) device in a wireless communication system according to various embodiments.

FIG. 1 is a diagram illustrating an example configuration of a massive multiple input multiple output (MIMO) unit (MMU) device in a wireless communication system according to various embodiments. Terms such as ' . . . unit', ' . . . device', used below may refer, for example, to a unit for processing at least one function or operation, which may be implemented by hardware or software, or a combination of hardware and software.

The base station 100 is a network infrastructure that provides wireless access to user equipment. The base station 100 has coverage defined as a certain geographic area based on a distance over which a signal can be transmitted. In addition to the base station, the base station 100 may be referred to as an 'access point (AP)', an 'eNodeB (eN)', a '5th generation node (5G node)', a '5G NodeB (5G NB)', a 'wireless point', a 'transmission/reception point (TRP)', an 'access unit', a 'distributed unit (DU)', a 'transmission/reception point (TRP)', a 'radio unit (RU)', a 'remote radio head (RRH)', or other terms having a technical meaning equivalent thereto. The base station 100 may transmit a downlink signal or receive an uplink signal.

A terminal is a device used by a user and performs communication with the base station 100 via a wireless channel. In some cases, the terminal may be operated without user involvement. For example, the terminal may be a device that performs machine type communication (MTC) and may not be carried by the user. In addition to the terminal, the terminal may be referred to as 'user equipment (UE)', a 'mobile station', a 'subscriber station', 'customer premises equipment (CPE)', a 'remote terminal', 'wireless terminal (wireless terminal)', an 'electronic device,' a 'vehicle terminal', a 'user device' or other terms having a technical meaning equivalent thereto.

Referring to FIG. 1, the base station 100 may be configured as a massive multi-input multi-output (MIMO) unit (MMU) device 110. The MMU device 110 may include a plurality of antenna elements. In order to increase a beamforming gain, a greater number of antenna elements may be used compared to an input port. The MMU device 110 may perform beamforming through a plurality of sub arrays.

Referring to FIG. 1, the MMU device 110 may include a plurality of antenna elements (e.g., a radiator), a power divider, a substrate (e.g., an antenna PCB), and a radome. According to an embodiment, the plurality of antenna elements may be configured as a plurality of sub arrays. For example, three antenna elements may include one sub array. For example, the sub array may be a 3×1 sub array. In addition, the plurality of sub arrays and the power divider may be disposed on the antenna PCB. The power divider may feed signals to the plurality of antenna elements included in each sub array. The feeding may refer to indirect feeding or direct feeding. According to an embodiment, the MMU device 110 may include a main PCB. The main PCB may be referred to as a main board, a mother board, or the like. The above-described substrate (e.g., the antenna PCB) may be disposed on the main PCB. An RF signal processed from a radio frequency integrated circuit (RFIC) disposed on the main PCB may be transmitted to a power divider of the antenna PCB via the main PCB. The power divider may feed the received RF signal to the plurality of antenna elements.

The MMU device 110 may include a substrate including a dielectric layer, such as plastic, to minimize and/or reduce production costs. However, the radiation performance of the antenna elements may be reduced due to a dielectric loss increasing by the dielectric layer. Accordingly, the disclosure provides a structure that can minimize and/or reduce production costs and alleviate the reduction of radiation performance efficiency, through a structure of a substrate including a plurality of air layers on a path along a power divider is disposed on the substrate (hereinafter, referred to as 'air layer substrate structure').

Hereinafter, the description will be given based on the MMU structure for convenience, but the device to which the air layer substrate structure according to an embodiment of the disclosure is applied is not limited to the MMU device. For example, the air layer substrate structure may be applied to an MMU device using a signal in a frequency range 1 (FR1) band (about 6 GHz) and a mmWave device using a signal in an FR2 band (about 24 GHz).

Hereinafter, before describing various example embodiments of the disclosure, the following terms may be used. For example, a substrate may be understood as referring to a structure including the same or similar technical meaning, such as a printed circuit board (PCB), a flexible printed circuit board (FPCB), a substrate, a board, a strip, and a micro strip, or the like. For another example, a power divider may be understood as referring to a structure including the same or similar technical meaning, such as a transmission line, a line, a feeding line, and a feeding unit, or the like. In addition, the rib (rib) may be understood as referring to a structure including the same or similar technical meaning, such as a support member, a support, or the like.

Figure 2:
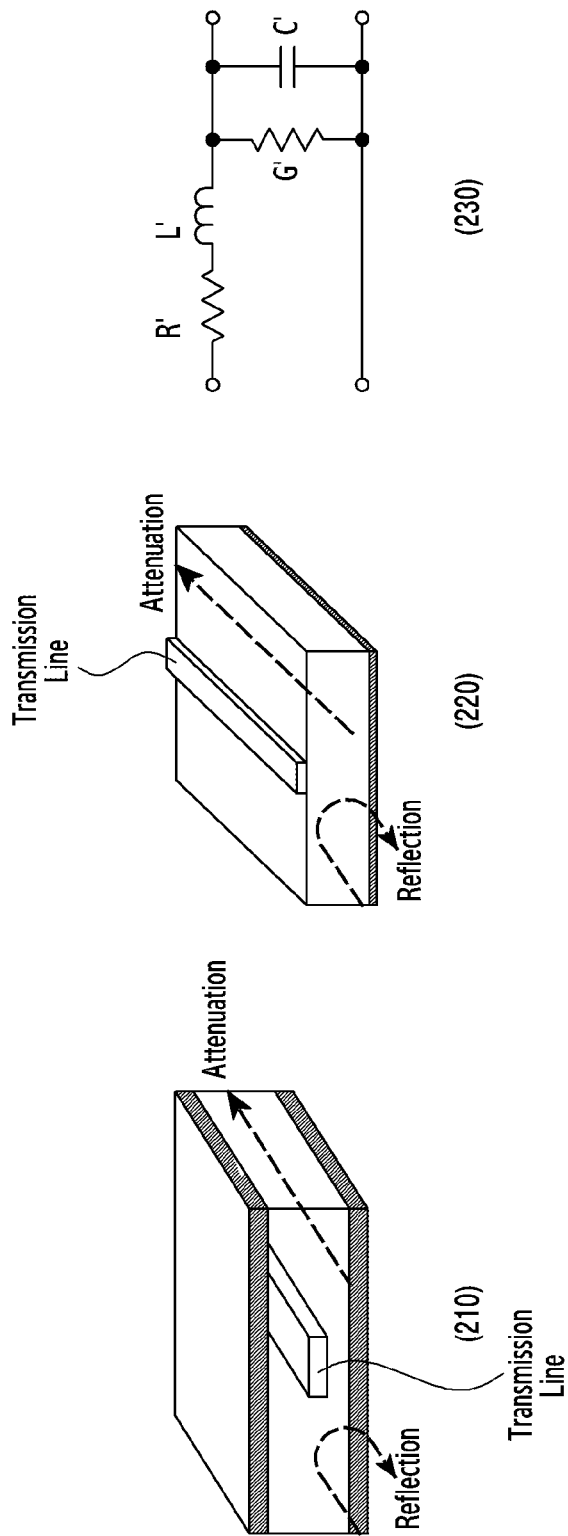
FIG. 2 is a diagram illustrating examples of various substrates to explain a loss due to transmission lines, according to various embodiments.

FIG. 2 is a diagram illustrating examples of various substrates to explain a loss due to transmission lines according to various embodiments. In FIG. 2, structures of a substrate including a transmission line will be described as examples. A strip 210 and a micro strip 220 in FIG. 2 may include a transmission line, and the description of the transmission line included in the strip 210 or the micro strip 220 may be understood the same as or similar to the description of the power divider of the disclosure.

Referring to FIG. 2, the strip 210 may include two metal layers, a dielectric layer disposed between the layers, and a transmission line. The micro strip 220 may include a transmission line, a dielectric layer, and a metal layer. In this case, the transmission line may refer to a path through which a signal passes. The structures of the strip 210 and the micro strip 220 may be simplified as in the equivalent circuit 230. For example, the strip 210 or the micro strip 220 may be expressed in the form of resistance and impedance.

A loss due to the transmission line may occur in the strip 210 or micro strip 220 when a signal passes through the transmission line. For example, the loss due to the transmission line may be generated by resistors (R', G'), inductor (L'), and conductor (C') initiated in the circuit 230. In addition, the loss due to transmission line may include reflection and attenuation and may have various causes. The relationship between the loss due to the transmission line (hereinafter, referred to as a transmission line loss) and the various losses may be calculated by equation below.

$$\alpha = \alpha_C + \alpha_D + \alpha_G + \alpha_R \quad \text{[Equation 1]}$$

$\alpha$ may denote transmission line loss, $\alpha_C$ may denote a loss due to metal conductivity, $\alpha_D$ may denote a loss due to dielectric loss tangent or a dielectric loss, $\alpha_G$ may denote a loss due to conductivity of dielectric, and $\alpha_R$ may denote a loss due to radiation.

Referring to equation above, a loss generated while a signal passes along a transmission line may be determined by a loss due to an adjacent component (e.g., a dielectric layer or a metal plate). For example, the transmission line loss may be calculated by the sum of attenuation or losses. Therefore, each loss may be required to be minimized to minimize and/or reduce transmission line losses. A loss due to the dielectric loss tangent may become a dominant factor as a frequency of a signal used by an electronic device increases. The loss due to the dielectric loss tangent may be expressed by equation below.

$$\alpha_D = 0.9106 \times \sqrt{\in_R} \times f \times \tan \delta \quad \text{[Equation 2]}$$

$\alpha_D$ may denote a loss due to dielectric loss tangent, $\in_R$ may denote a relative permittivity, f may denote a frequency of a signal, and tan $\delta$ may denote a loss tangent.

The loss due to radiation ($\alpha_R$) may be minimized and/or reduced through impedance matching. The loss due to the conductivity of dielectric ($\alpha_G$) may be generated by the dielectric which contains a metal component rather than a pure dielectric and may thus have a very small value. In addition, the loss due to metal conductivity ($\alpha_C$) may be proportional to the square root of a frequency of a signal, and the loss due to dielectric loss tangent ($\alpha_D$) may be proportional to a frequency. In general, the loss due to metal conductivity may be a dominant factor determining the transmission line loss, but the loss due to dielectric loss tangent may be a dominant factor as a frequency of a signal passing through the transmission line increases.

Considering the description above, since the MMU device uses a signal in a high frequency band (FR1 band: about 6 GHz) and the mmWave device uses a signal in a frequency band (FR2 band: about 24 GHz) higher than the MMU device, the transmission line loss may be dominantly determined by the loss due to dielectric loss tangent. Accordingly, a dielectric layer or a substrate on which the transmission line is disposed should to be designed to have low dielectric permittivity in order to minimize and/or reduce the transmission line loss. In general, a medium having a low dielectric permittivity among dielectrics used in a substrate may be air. A substrate in a region adjacent to a path along the transmission line is disposed on the substrate may require an air layer. Hereinafter, a structure of a substrate for minimizing and/or reducing a loss due to a transmission line will be described in relation to an electronic device using a high frequency signal.

Figure 3:
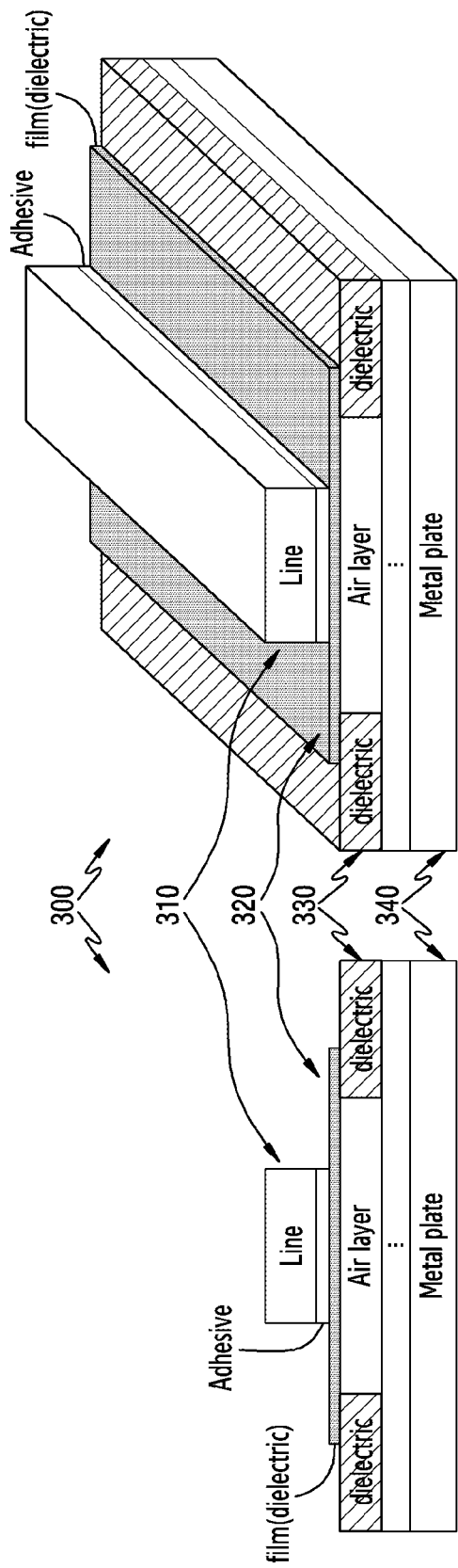
FIG. 3 is a diagram illustrating an example of a substrate structure including an air layer according to various embodiments.

FIG. 3 illustrates an example of a substrate structure including an air layer, according to an embodiment of the disclosure. FIG. 3 illustrates a substrate having at least one layer. For example, the substrate having at least one layer may be a micro strip.

FIG. 3 is a diagram illustrating a cross-sectional and perspective view of a substrate 300 viewed from the side according to various embodiments. The substrate 300 may include a transmission line 310, an adhesive, a film 320, a dielectric layer 330 including an air layer, and a metal plate 340. According to an embodiment, the transmission line 310 may be disposed in a region corresponding to a region in which the air layer of the dielectric layer 330 is formed. For example, an air layer may be formed in a region including a region in which the transmission line 310 is disposed and a region adjacent thereto.

According to an embodiment, the film 320 may be disposed between the transmission line 310 and the dielectric layer 330. In other words, the film 320 may be disposed between the transmission line 310 and the dielectric layer 330 to be in a region in which the transmission line 310 is disposed. FIG. 3 illustrates that the area of the region in which the film 320 is disposed is narrower than that of the dielectric layer 330 and wider than that of the transmission line 310, but the disclosure is not limited thereto. The film 320 may be determined based on the region of the air layer formed in the region corresponding to the region in which the transmission line 310 is disposed. As the film 320 is disposed between the dielectric layer 330 and the transmission line 310, the film 320 may shield the air layer of the dielectric layer 330. In addition, the film 320 may be formed of a dielectric material.

Although not shown in FIG. 3, the substrate 300 may further include a dielectric layer that does not include an air layer. The dielectric layer that does not include an air layer may include a material such as a flame retardant material. The substrate 300 may further include a dielectric layer without an air layer between the transmission line 310 and the dielectric layer 330 including an air layer. In addition, although not shown in FIG. 3, in order to prevent and/or reduce damage to the substrate 300 by the heat of the transmission line 310, a hole having a size smaller than an air layer may be formed in the film 320 in a region corresponding to a region in which the air layer is formed. The small hole can prevent or reduce damage to the film 320 and the substrate 300 by the expansion or contraction of air when heat is generated in the transmission line 310 or the temperature in the substrate 300 changes.

Considering the description above, the transmission line may be disposed on a substrate including one or more layers. A specific layer of the one or more layers included in the substrate may be a dielectric layer including an air layer. When a signal is transmitted through the transmission line, a dielectric loss may be minimized and/or reduced by the air layer, thereby minimizing and/or reducing the transmission line loss. Hereinafter, in order to form an air layer, an aperiodic method including a plurality of support members in a dielectric layer and a periodic method including a plurality of air holes will be described in greater detail below.

Figure 4A:
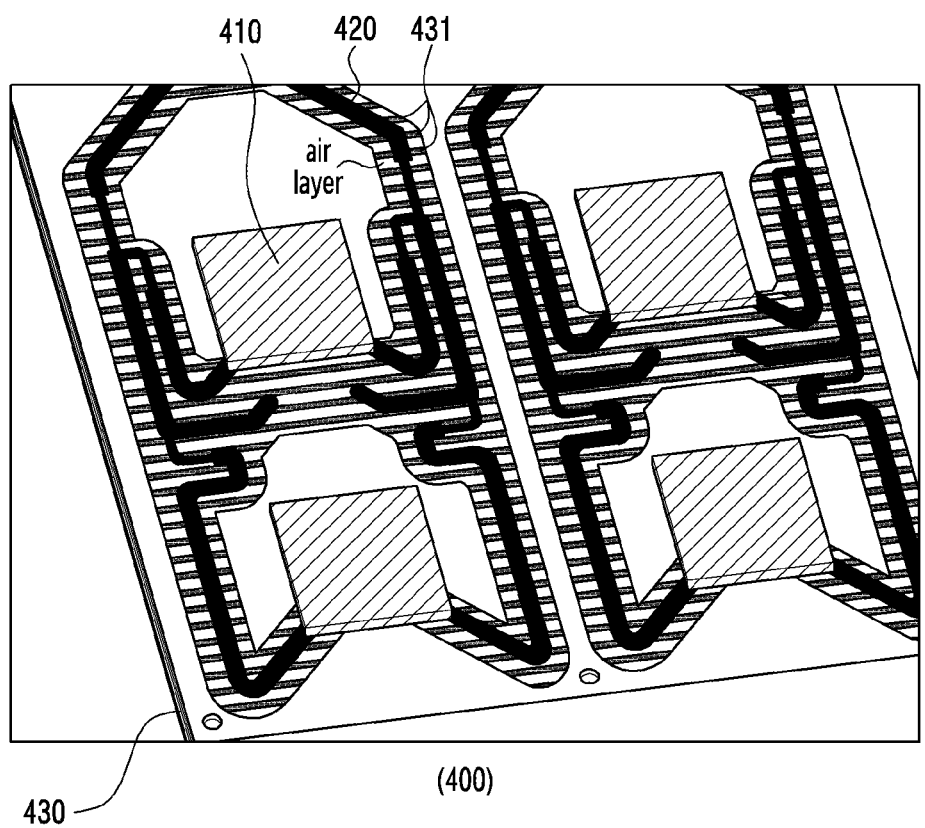
FIG. 4A is a diagram illustrating an example of an antenna structure including a rib substrate according to various embodiments.

FIG. 4A is a diagram illustrating an example of an antenna structure including a rib substrate according to various embodiments. The rib substrate may refer to a substrate including a support structure in one or more layers of the substrate. The support structure may refer to a structure including a plurality of support members. The support member may be referred to as a rib.

A configuration of the antenna structure 400 illustrated in FIG. 4A is merely an example for convenience of description, and the structure of the disclosure is not limited thereto. For example, the antenna structure 400 may include a power divider 420 for coupling the antenna elements. In this case, the arrangement or wiring of the power divider 420 is not limited to the antenna structure 400 of FIG. 4 and may be arranged or wired according to circumstances. In addition, although the antenna element 410 in the form of a metal patch is shown in the antenna structure 400, this is to clearly express the arrangement of the power divider 420 and does not indicate that the structure of the antenna element is limited thereto. For example, the antenna element 410 may be a radiator having a planar structure. As another example, the antenna element 410 may be radiator having a three-dimensional structure.

Referring to FIG. 4A, the antenna structure 400 may include an antenna element 410, a power divider 420, and a substrate 430. According to an embodiment, the power divider 420 may refer to a transmission line configured to transmit a signal to the antenna elements 410. The transmitting a signal may be referred to, for example, as feeding a signal. The feeding may include both indirect feeding and direct feeding. The power divider 420 may be disposed on the substrate 430 to connect the antenna elements 410. A region in which the power divider 420 is disposed or wired on the substrate 430 may be referred to as an arrangement path or a wiring path. For example, the arrangement path or the wiring path may be formed in consideration of other modules or components of the substrate 430.

According to an embodiment, the substrate 430 may include a plurality of support members 431. The plurality of support members 431 may refer to a support structure for supporting the power dividers 420. The plurality of support members 431 may be formed in a region corresponding to the region in which the power divider 420 is disposed. In other words, the support member 431 may be disposed on at least one layer of the substrate 430 in consideration of a region in which the power divider 420 is disposed or is to be disposed. That is, the substrate 430 may have a laminated structure including one or more layers. In this case, at least one layer in which the plurality of support members 431 are disposed may be a dielectric layer.

According to an embodiment, the support member 431 may be formed of a dielectric material. In addition, an air layer may be formed between the plurality of support members 431. In other words, an air layer may be formed between the plurality of support members 431 by disposing the power divider 420 on the support members 431. Hereinafter, a structure of a substrate including a plurality of support members will be described in greater detail below with reference to FIG. 4B.

Figure 4B:
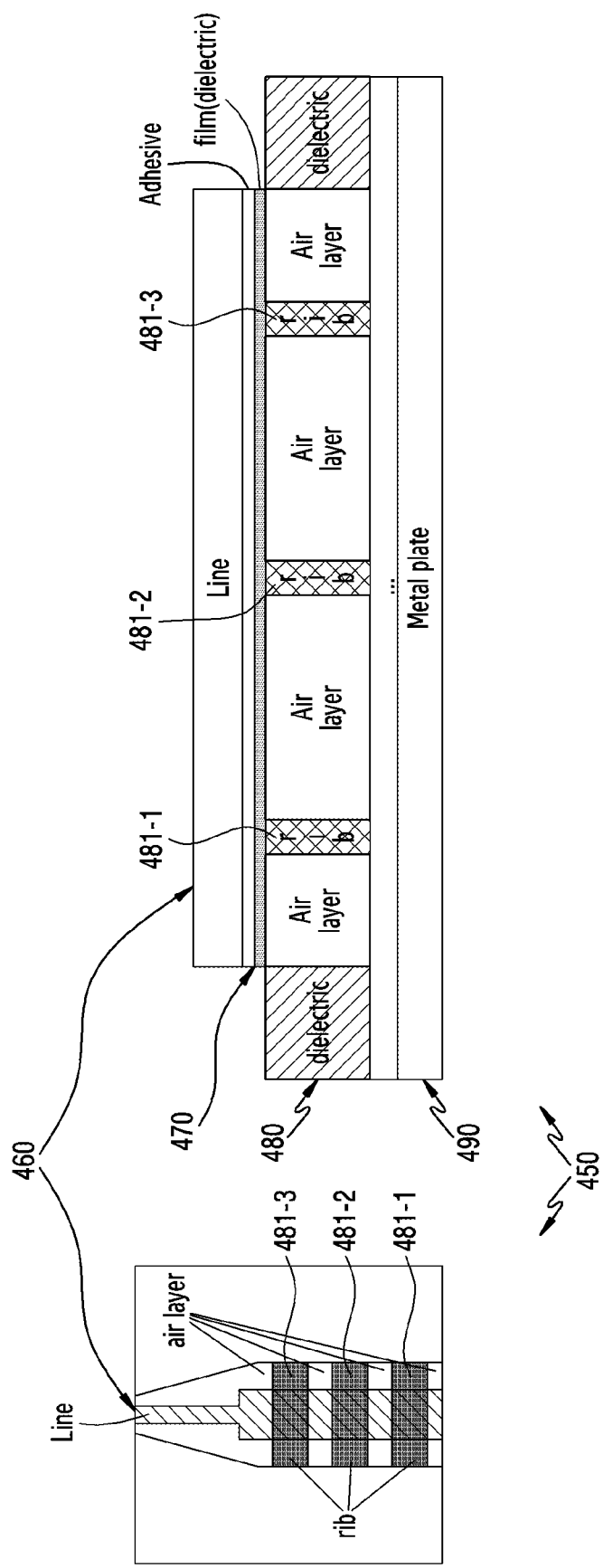
FIG. 4B is a diagram including a cross-sectional view illustrating an example of a structure for a rib substrate according to various embodiments.

FIG. 4B is a diagram including a cross-sectional view illustrating an example of a structure for a rib substrate according to various embodiments. The substrate 450 illustrated in FIG. 4B may be understood the same as or similar to the substrate 300 of FIG. 3. Accordingly, the description of the substrate 300 of FIG. 3 may be applied to the substrate 450 illustrated in FIG. 4B. In FIG. 4B, the left drawing illustrates the substrate 450 vertically viewed from the above, and the right drawing illustrates a cross-sectional view of the substrate 450 viewed from the side.

Referring to FIG. 4B, the substrate 450 may include a transmission line 460, a film 470, a dielectric layer 480, and a metal plate 490. According to an embodiment, the substrate 450 may include one or more layers. A specific layer of the one or more layers may be a dielectric layer 480. The dielectric layer may refer to a layer in which a plurality of support members 481-1, 481-2 and 481-3 (which may be referred to as 481-1 to 481-3) are disposed and may refer to a layer in which an air layer is formed.

According to an embodiment, the transmission line 460 may be disposed in a region corresponding to an air layer. In other words, the transmission line 460 may be disposed on the support members 481-1 to 481-3 and may be disposed in a region corresponding to the air layer formed by the support members 481-1 to 481-3. In addition, the film 470 may be disposed between the transmission line 460 and a dielectric layer. The film 470 may be formed of a dielectric.

According to an embodiment, the support members 481-1 to 481-3 may be disposed to be spaced apart from each other by a predetermined (e.g., specified) distance. For example, the distance between the first support member 481-1 and the second support member 481-2 may be the same as or similar to the distance between the second support member 481-2 and the third support member 481-3. As another example, the distance between the first support member 481-1 and the second support member 481-2 may be different from the distance between the second support member 481-2 and the third support member 481-3. In addition, lengths of the support members 481-1 to 481-3 may be different from each other. For example, although lengths of the support members 481-1 to 481-3 are illustrated to be the same in the left drawing of FIG. 4B, the lengths of the support members 481-1 to 481-3 may be different from each other in consideration of a path along which the transmission line 460 (e.g., the power divider) is disposed.

According to an embodiment, the air layer may be formed in the dielectric layer 480 and may be formed between the support members 481-1 to 481-3. In addition, the air layer may be shielded by a film 470. Although not shown in FIGS. 4A and 4B, in order to prevent or reduce damage to the substrate 300 by the heat of the transmission line 460, the film 470 in a region corresponding to a region of the air layer formed between the support members may include a hole having a size smaller than the size of the air layer. The small hole may prevent or reduce damage to the film 470 and the substrate 450 due to expansion or contraction of air when heat is generated in the transmission line or the temperature in the substrate changes.

Referring to FIGS. 4A and 4B, an antenna structure including a rib substrate according to an embodiment of the disclosure may include a support structure (e.g., a plurality of support members) in a region of a substrate on which a power divider (e.g., a transmission line) is disposed or wired. Accordingly, the transmission line loss of a signal moving along the power divider may be minimized and/or reduced. In other words, the dielectric permittivity may be lowered by the air layer formed by the support members, and the dielectric loss may be minimized and/or reduced. In a case of a signal in a high frequency region, since a dielectric loss is a dominant factor over a transmission line loss, the transmission line loss may be reduced. As the transmission line loss is lowered, the antenna structure may have improved radiation performance.

Regions where the support members overlap with the power divider (e.g., the transmission line) may be formed aperiodically in the antenna structure including a rib substrate as described above. For example, when the support members and the power divider are arranged to be orthogonal to each other, the regions where the support members overlap with the power divider may be minimal. However, when the support members and the power divider are not orthogonal to each other or arranged parallel to each other, the regions the support members overlap with the power divider may be maximal. In other words, the areas of the regions where the power divider overlaps with the support members may not be the same but may be formed differently.

Figure 5:
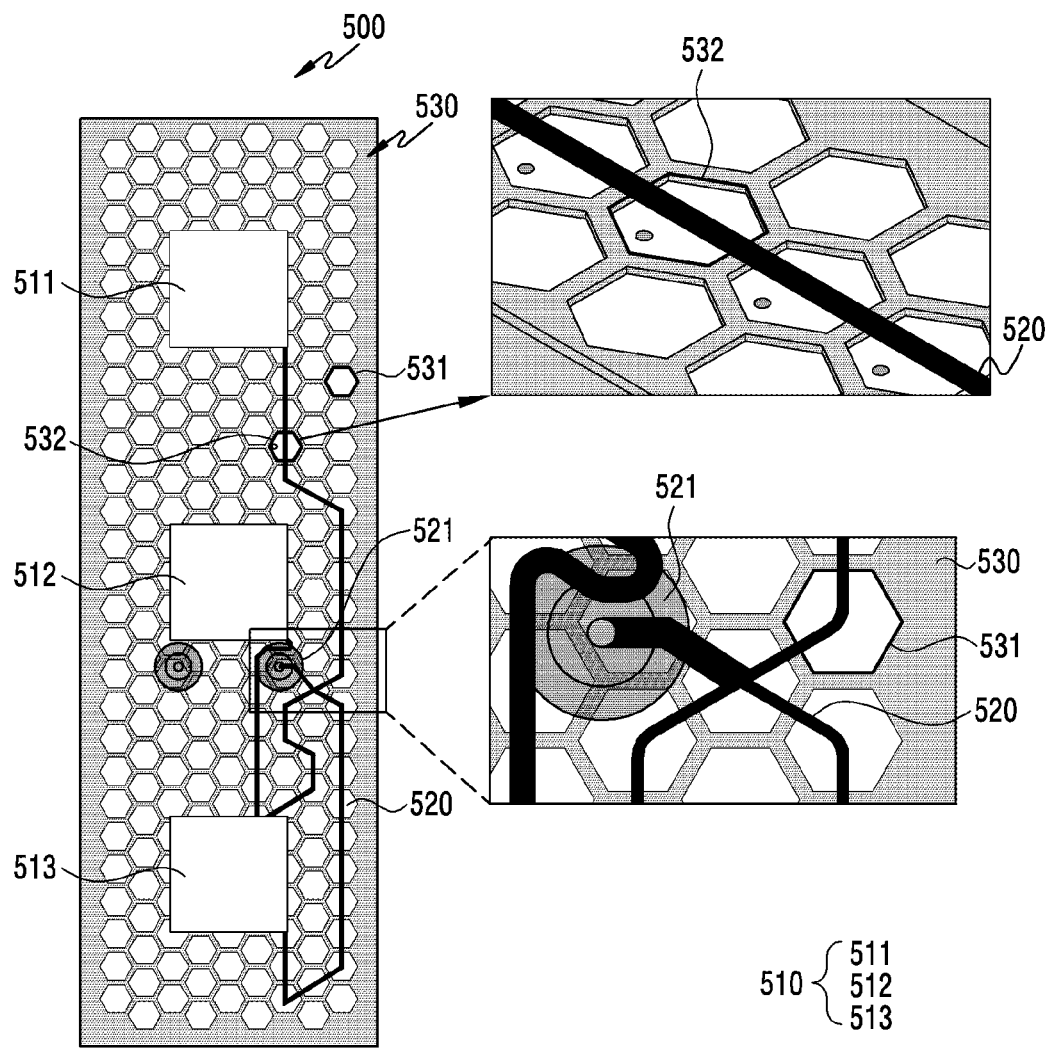
FIG. 5 is a diagram illustrating an example of an antenna structure including an air hole substrate according to various embodiments.

FIG. 5 is a diagram illustrating an example of an antenna structure including an air hole substrate structure according to various embodiments. A configuration of the antenna structure 500 shown in FIG. 5 is merely an example for convenience of description, and the structure of the disclosure is not limited thereto. For example, in FIG. 5, the antenna structure 500 is illustrated including three antenna elements 510 (including 511, 512 and 513), but this is only for showing one sub array and is not limited thereto. Accordingly, the antenna structure 500 may include a sub array including more than three antenna elements or less than three antenna elements. As another example, the antenna structure 500 may include a power divider 520 for coupling the antenna elements. In this case, the arrangement or wiring of the power divider 520 is not limited to the antenna structure 500 of FIG. 5 and may be arranged or wired according to circumstances. In addition, the substrate 530 illustrated in FIG. 5 may be understood the same as the substrate 300 of FIG. 3. Accordingly, the description of the substrate 300 of FIG. 3 may be applied to the substrate 530 illustrated in FIG. 5.

Referring to FIG. 5, the antenna structure 500 may include antenna elements 510, a power divider 520, and a substrate 530. According to an embodiment, the antenna elements 510 may include a first antenna element 511, a second antenna element 512, and a third antenna element 513. The antenna elements 510 may refer to a sub array. Each of the antenna elements 510 may radiate a signal transmitted from the power divider 520 to another electronic device or into the air. In this case, the antenna elements 510 may receive a signal directly or indirectly from the power divider 520. Receiving a signal may refer to feeding. In FIG. 5, the antenna elements 510 are illustrated as a radiator in the form of a metal patch, but an embodiment of the disclosure is not limited to the radiator having the above structure. For example, the antenna elements 510 may be a radiator having a planar structure. As another example, the antenna elements 510 may be a radiator having a three-dimensional structure.

According to an embodiment, the power divider 520 may refer to a transmission line configured to transmit a signal to the antenna elements 510. Referring to FIG. 5, the power divider 520 may be connected to a feeding point 521 in a region adjacent to the second antenna element 512. The power divider 520 may transmit a signal fed from the feeding point 521 to the first antenna element 511 or the third antenna element 513. In this case, the power divider 520 may be disposed on the substrate 530 to connect the antenna elements 510. A region in which the power divider 520 is disposed or wired on the substrate 530 may be referred to as an arrangement path or a wiring path. For example, the arrangement path or the wiring path may be formed in consideration of other modules or components of the substrate 530. A method and a rule in which the power divider 520 is disposed (or wired) between the air holes 531 of the substrate 530 will be described in greater detail below with reference to FIGS. 6A to 6B.

According to an embodiment, the substrate 530 may include a plurality of air holes 531. The air holes 531 included in the substrate 530 may be formed in various shapes. For example, the air holes 531 may be formed in a regular triangle, a square, or a regular hexagon, or the like. In addition, the air holes 531 of the substrate 530 may also be formed in a region (e.g., an arrangement path or a wiring path) where the power divider 520 is disposed. For example, the air holes 531 may be formed in a region in which the power divider 520 is disposed or in a region adjacent to the region the power divider 520 is disposed. As another example, the air holes 531 may be formed in the substrate 530 in consideration of a region in which the power divider 520 is to be disposed. Referring to FIG. 5, the substrate 530 may include air holes 531 not only in a region in which the power divider 520 is disposed and a region adjacent thereto but also in a region not adjacent to the power divider 520 (e.g., a region in which the power divider is to be disposed). In addition, the substrate 530 may have a laminated structure including one or more layers. In this case, the air holes 531 may be formed in at least one layer of the substrate 530 including one or more layers. The at least one layer in which the air holes 531 are formed may be a dielectric layer. Accordingly, a region between the air holes 531 (e.g., the edge portion of the air holes 531) may be a dielectric.

According to an embodiment, the substrate 530 may include a film between the power divider 520 and the dielectric layer in which the plurality of air holes 531 are formed. For example, the film may shield the air inside the air holes 531. In this case, the film may be formed of a dielectric. Referring to the air holes 532, in order to prevent or reduce damage to the substrate 530 by heat of the power divider 520 (or a transmission line), a hole having a size smaller than the size of the air holes 532 may be formed in the film in a region corresponding to a region in which the air holes 532 are formed. The small hole may prevent or reduce damage to the film and the substrate 530 due to expansion or contraction of air when heat is generated in the power divider 520 or a temperature in the substrate changes.

Considering the above, the antenna structure including the air hole substrate structure according to an embodiment of the disclosure may include an air hole in a region of the substrate on which the power divider (e.g., a transmission line) is disposed or wired. Accordingly, a transmission line loss of a signal moving along the power divider may be minimized and/or reduced. In other words, a dielectric loss among the losses due to the transmission line may be minimized and/or reduced by the air layer of the air hole. In a case of a signal in a high frequency region, since a dielectric loss is a dominant factor over the transmission line loss, the transmission line loss may be lowered. As the transmission line loss is lowered, the antenna structure may have improved radiation performance.

Regions where the air holes overlap with the power divider may be periodically formed in the antenna structure including the air hole substrate structure as described above. For example, unlike the antenna structures of FIGS. 4A and 4B, in the antenna structure of FIG. 5, regions where the power divider overlaps with the dielectric regions formed between the air holes may all have the same area. Hereinafter, the arrangement rule between the air hole structure and the transmission line will be described in greater detail below with reference to FIGS. 6A and 6B.

Figure 6A:
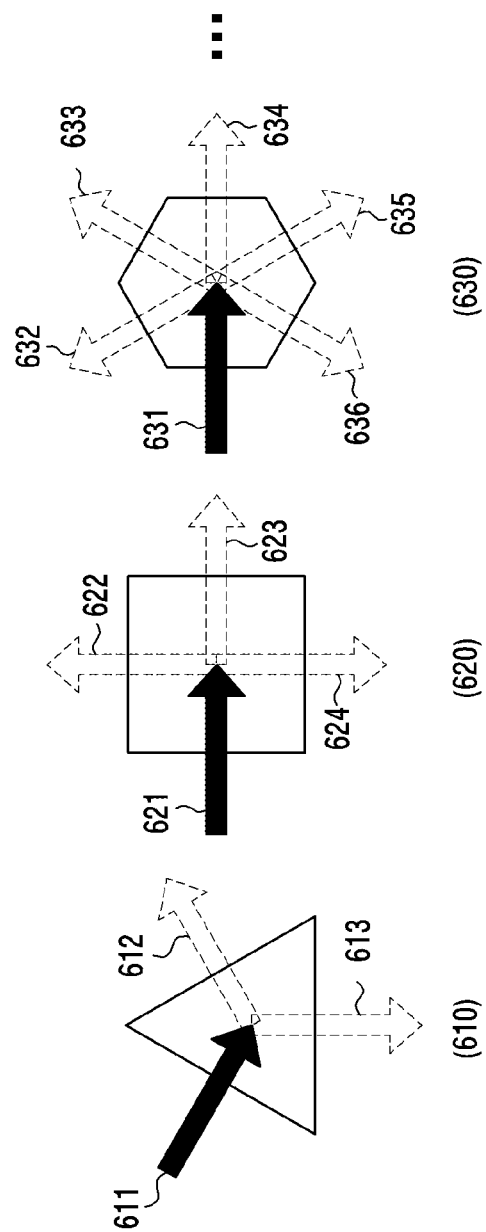
FIG. 6A is a diagram illustrating an example of a method for disposing a power divider according to an air hole structure according to various embodiments.

FIG. 6A is a diagram illustrating an example of a method for disposing a power divider, according to an air hole structure according to various embodiments. A case in which one transmission line is disposed over one air hole is described as an example with reference to FIG. 6A, but this is for convenience of description, and the disclosure is not limited thereto. A transmission line indicated by a solid line in FIG. 6A may indicate a direction in which the same faces toward the center of the air hole, and a transmission line indicated by a dotted line may indicate a direction in which the same exits from the center of the air hole.

According to an embodiment, the air holes may be formed in a polygonal shape. For example, the air holes may be formed of a regular triangular air hole 610, a square air hole 620, and a regular hexagonal air hole 630. Although the air hole is illustrated forming in a shape of a regular polygon, the disclosure is not limited thereto, and the air hole may be formed in a shape identical or similar thereto. That is, though not having the shape of a regular polygon, the disclosure may include a case in which the air hole has electrically the same characteristics as a regular polygonal air hole. In addition, although FIG. 6A shows the structure of a regular triangular air hole 610, a square air hole 620, and a regular hexagonal air hole 630, the air hole structure according to an embodiment of the disclosure may have a structure such as a regular octagon and a regular decagon. For convenience of description, the air hole structure is shown two dimensionally in FIG. 6A, but the air hole structure may be understood as a three-dimensional figure as illustrated in FIGS. 7C and 7D.

Referring to the air hole 610, the transmission line may be disposed to coincide with the center of the air hole 610 along the first direction 611. In other words, the transmission line may be disposed to coincide with the center of the air hole 610 through one point on a first side of the air hole 610. For example, the transmission line may be disposed to coincide with the center of the air hole 610 through the midpoint of the first side of the air hole 610. The center of the air hole 610 may refer to a center of gravity. In addition, the transmission line may be disposed in a direction in which the same exits from the center of the air hole 610 through one point on the other sides except for the first side of the air hole 610. For example, the transmission line may be disposed in a direction in which the same exits from the center of the air hole 610 along a second direction 612 or a third direction 613 of the air hole 610. In this case, the transmission line may be disposed in a direction in which the same exits from the center of the air hole 610 through the midpoint of a second side or a third side of the air hole 610.

Referring to the air hole 620, the transmission line may be disposed to coincide with the center of the air hole 620 along a first direction 621. In other words, the transmission line may be disposed to coincide with the center of the air hole 620 through one point on a first side of the air hole 620. For example, the transmission line may be disposed to coincide with the center of the air hole 620 through the midpoint of the first side of the air hole 620. The center of the air hole 620 may refer to a center of gravity. In addition, the transmission line may be disposed in a direction in which the same exits from the center of the air hole 620 through one point on the other sides except for the first side of the air hole 620. For example, the transmission line may be disposed in a direction in which the same exits from the center of the air hole 620 along a second direction 622, the third direction 623, or a fourth direction 624 of the air hole 620. In this case, the transmission line may be disposed in a direction in which the same exits from the center of the air hole 620 through the midpoint of a second side, a third side, or a fourth side of the air hole 620.

Referring to the air hole 630, the transmission line may be disposed to coincide with the center of the air hole 630 along a first direction 631. In other words, the transmission line may be disposed to coincide with the center of the air hole 630 through one point on a first side of the air hole 630. For example, the transmission line may be disposed to coincide with the center of the air hole 630 through the midpoint of the first side of the air hole 630. The center of the air hole 630 may refer to a center of gravity. In addition, the transmission line may be disposed in a direction in which the same exits from the center of the air hole 630 through one point on the other sides except for the first side of the air hole 630. For example, the transmission line may be disposed in a direction in which the same exits from the center of the air hole 630 along a second direction 632, a third direction 633, a fourth direction 634, a fifth direction 635, or a sixth direction 636 of the air hole 630. In this case, the transmission line may be disposed in a direction in which the same exits from the center of the air hole 630 through the midpoint of a second side, a third side, a fourth side, a fifth side, or a sixth side of the air hole 630.

Referring to the description above, the air hole structure according to an embodiment of the disclosure may be disposed in a direction in which the same enters the center (e.g., a center of gravity) of the air hole structure through one point (e.g., the midpoint) of a first side of a regular polygonal air hole structure. In addition, the transmission line may be disposed in a direction in which the same exits from the center of the air hole structure through one point on one side of the remaining sides other than the first side. The arrangement of the transmission line may be to minimize and/or reduce a phase error of a signal. Characteristics of a signal passing through the transmission line may be changed by an adjacent region of the transmission line. Accordingly, in the disclosure, the transmission line and the air hole may be arranged in a symmetrical or periodic structure in order to minimize and/or reduce the error.

In addition, for the substrate including an air hole structure according to an embodiment of the disclosure, the air hole structure may be determined in consideration of the degree of freedom. The degree of freedom may be related to the number of cases in which the transmission line may be arranged (e.g., the number of arrangement paths). For example, in a structure of the regular triangular air hole 610, when the transmission line is disposed to enter the center of the air hole 610 along the first direction 611, the transmission line may be disposed to exit from the center of the air hole 610 along the second direction 612 or the third direction 613. In this case, the angle between the first direction 611 and the second direction 612 or the first direction 611 and the third direction 613 may be 120°, and this angle may refer to a degree of freedom value. For another example, the degree of freedom value may be 90° in a structure of the square air hole 620, and the degree of freedom value may be 60° in a structure of the regular hexagonal air hole 630. Accordingly, the lower the degree of freedom value, the greater the number of paths in which a transmission line may be disposed on a substrate. In other words, the substrate including an air hole structure according to an embodiment of the disclosure may use a regular hexagonal air hole structure having a low degree of freedom value (e.g., the high degree of freedom) when the arrangement of the transmission line is complicated.

Figure 6B:
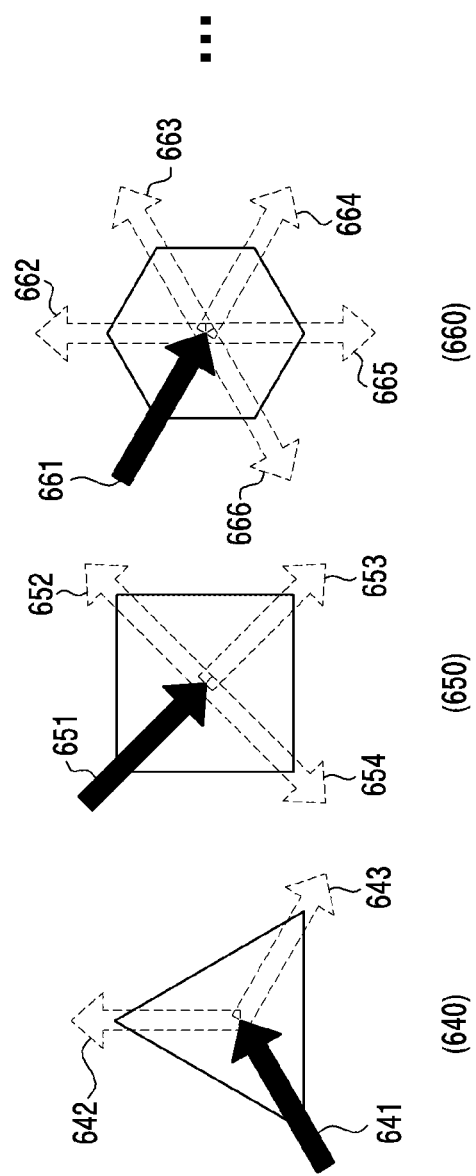
FIG. 6B is a diagram illustrating another example of a method for disposing a power divider based on an air hole structure according to various embodiments.

FIG. 6B is a diagram illustrating another example of a method for disposing a power divider according to an air hole structure according to various embodiments. A case in which one transmission line is disposed over one air hole is described as an example with reference to FIG. 6B, but this is for convenience of description, and the disclosure is not limited thereto. In FIG. 6B, a transmission line indicated by a solid line may indicate a direction in which the same faces toward the center of the air hole, and a transmission line indicated by a dotted line may indicate a direction in which the same exits from the center of the air hole. FIG. 6B illustrates an example in which a transmission line is disposed through one vertex of the air hole, rather than passing through one point on one side of the air hole.

According to an embodiment, the air hole may be formed in a polygonal shape. For example, the air hole may be formed in a structure of a regular triangular air hole 640, a square air hole 650, and a regular hexagonal air hole 660. Although the air hole is illustrated forming in a shape of a regular polygon, the disclosure is not limited thereto, and the air hole may be formed in a shape identical or similar thereto. For example, though not having the shape of a regular polygon, the disclosure may include a case in which the air hole has electrically the same characteristics as a regular polygonal air hole. In addition, although FIG. 6B shows the structure of a regular triangular air hole 640, a square air hole 650, and a regular hexagonal air hole 660, the air hole structure according to an embodiment of the disclosure may have a structure such as a regular octagon and a regular decagon. For convenience of description, the air hole structure is shown two dimensionally in FIG. 6B, but the air hole structure may be understood as a three-dimensional figure as illustrated in FIGS. 7C and 7D.

Referring to the air hole 640, the transmission line may be disposed to coincide with the center of the air hole 640 along a first direction 641. In other words, the transmission line may be arranged to coincide with the center of the air hole 640 through one of the vertices of the air hole 640. For example, the transmission line may be disposed to coincide with the center of the air hole 640 through a first vertex of the air hole 640. The center of the air hole 640 may refer to a center of gravity. In addition, the transmission line may be disposed in a direction in which the same exits from the center of the air hole 640 through one of the remaining vertices except for the first vertex of the air hole 640. For example, the transmission line may be disposed in a direction in which the same exits from the center of the air hole 640 along a second direction 642 or a third direction 643 of the air hole 640. In this case, the transmission line may be disposed in a direction in which the same exits from the center of the air hole 640 through a second vertex or a third vertex of the air hole 640.

Referring to the air hole 650, the transmission line may be disposed to coincide with the center of the air hole 650 along a first direction 651. In other words, the transmission line may be arranged to coincide with the center of the air hole 650 through one of the vertices of the air hole 650. For example, the transmission line may be disposed to coincide with the center of the air hole 650 through a first vertex of the air hole 650. The center of the air hole 650 may refer to a center of gravity. In addition, the transmission line may be disposed in a direction in which the same exits from the center of the air hole 650 through one of the remaining vertices except for the first vertex of the air hole 650. For example, the transmission line may be disposed in a direction in which the same exits from the center of the air hole 650 along a second direction 652, a third direction 653, or a fourth direction 654 of the air hole 650. In this case, the transmission line may be disposed in a direction in which the same exits from the center of the air hole 650 through a second vertex, a third vertex, or a fourth vertex of the air hole 650.

Referring to the air hole 660, the transmission line may be disposed to coincide with the center of the air hole 660 along the first direction 661. In other words, the transmission line may be arranged to coincide with the center of the air hole 660 through one of the vertices of the air hole 660. For example, the transmission line may be disposed to coincide with the center of the air hole 660 through a first vertex of the air hole 660. The center of the air hole 660 may refer to a center of gravity. In addition, the transmission line may be disposed in a direction in which the same exits from the center of the air hole 660 through one of the remaining vertices except for the first vertex of the air hole 660. For example, the transmission line may be disposed in a direction in which the same exits from the center of the air hole 660 along a second direction 662, a third direction 663, a fourth direction 664, a fifth direction 665, or a sixth direction 666 of the air hole 660. In this case, the transmission line may be disposed in a direction in which the same exits from the center of the air hole 660 through a second vertex, a third vertex, a fourth vertex, a fifth vertex, or a sixth vertex of the air hole 660.

Referring to the description above, the air hole structure according to an embodiment of the disclosure may be disposed in a direction in which the same enters the center (e.g., a center of gravity) of the air hole structure through one point (e.g., a vertex) of a regular polygonal air hole structure. In addition, the transmission line may be disposed in a direction in which the same exits from the center of the air hole structure through one point of the remaining vertices other than the vertex. The arrangement of the transmission line may be to minimize and/or reduce a phase error of a signal. Characteristics of a signal passing through the transmission line may be changed by an adjacent region of the transmission line. Accordingly, in the disclosure, the transmission line and the air hole may be arranged in a symmetrical or periodic structure in order to minimize and/or reduce the error.

In addition, for the substrate including an air hole structure according to an embodiment of the disclosure, the air hole structure may be determined in consideration of the degree of freedom. The degree of freedom may be related to the number of cases in which the transmission line may be arranged (e.g., the number of arrangement paths). For example, in a structure of the regular triangular air hole 640, when the transmission line is disposed to enter the center of the air hole 640 along the first direction 641, the transmission line may be disposed to exit from the center of the air hole 640 along the second direction 642 or the third direction 643. In this case, the angle between the first direction 641 and the second direction 642 or the first direction 641 and the third direction 643 may be 120°, and this angle may refer to a degree of freedom value. For another example, the degree of freedom value may be 90° in a structure of the square air hole 650, and the degree of freedom value may be 60° in a structure of the regular hexagonal air hole 660. Accordingly, the lower the degree of freedom value, the greater the number of paths in which a transmission line may be disposed on a substrate. In other words, the substrate including an air hole structure according to an embodiment of the disclosure may use a regular hexagonal air hole structure having a low degree of freedom value (e.g., the high degree of freedom) when the arrangement of the transmission line is complicated. Hereinafter, a substrate structure according to an air hole structure will be described in greater detail below with reference to FIGS. 7A, 7B, 7C and 7D.

Figure 7A:
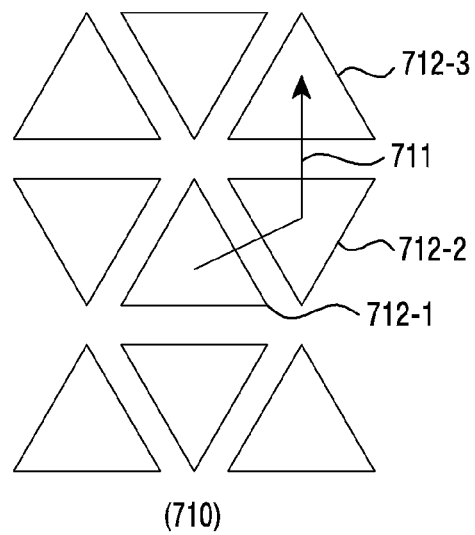
FIG. 7A is a diagram illustrating an example of an arrangement state of a power divider and a substrate including an air hole, according to various embodiments.
Figure 7A:
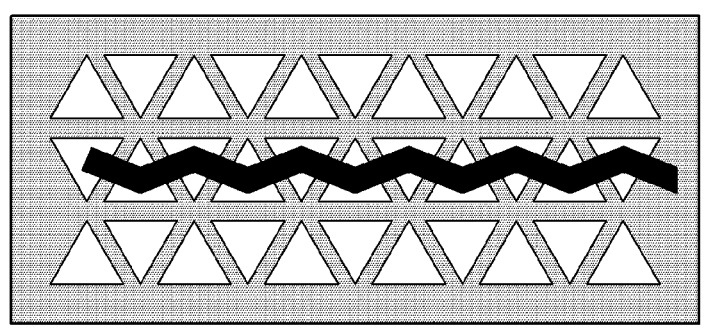

FIG. 7A illustrates an example of an arrangement state of a power divider and a substrate including an air hole, according to an embodiment of the disclosure. In FIG. 7A, a transmission line arrangement for the air hole structure of FIG. 6A will be described as an example. In other words, the transmission line is disposed in a direction in which the same enters and exits from the center of the air hole structure through one point on one side of the air hole structure. However, the description of FIG. 7A is not limited to the example and may be equally applied to a transmission line arranged in a direction in which the same enters and exits from the center of the air hole structure through one vertex of the air hole structure disclosed in FIG. 6B. For convenience of description, the air hole structure is shown two dimensionally in FIG. 7A, but the air hole structure may be understood as a three-dimensional figure as illustrated in FIGS. 7C and 7D. For example, the air hole structure of FIG. 7A may be understood as a triangular prism.

710 in the top of FIG. 7A shows an arrangement or wiring state of a transmission line 711 and a plurality of regular triangular air hole structures 712-1, 712-2 and 712-3 (which may be referred to as 712-1 to 712-3). Referring to 710, the transmission line 711 may be disposed to connect the center (e.g., a center of gravity) of a first air hole 712-1 to the centers of a second air hole 712-2 and a third air hole 712-3. In this case, the first air hole 712-1 may be a part of a path connected to a feeding point. According to an embodiment, the transmission line 711 may pass through one side of the second air hole 712-2 via one side of the first air hole 712-1 to be disposed to coincide with the center of the second air hole 712-2. According to an embodiment, the transmission line 711 may pass through one vertex of the second air hole 712-2 via one vertex of the first air hole 712-1 to be disposed to coincide with the center of the second air hole 712-2.

A substrate 720 including the structure indicated by drawing 710 is shown in the bottom of FIG. 7A. A transmission line may be disposed on the substrate 720 including regular triangular air hole structures as described above. According to an embodiment, the distances between the air hole structures of the substrate 720 may be the same. For example, in drawing 710, the distance between the center of the first air hole 712-1 and the center of the second air hole 712-2 may be the same as the distance between the center of the second air hole 712-2 and the center of the third air hole 712-3. Accordingly, the areas of regions where the dielectric region between the air holes overlap with the transmission line (e.g., a power divider) may be the same.

Figure 7B:
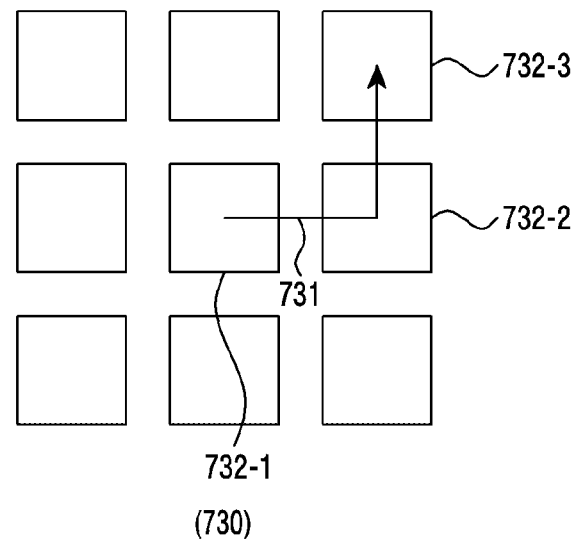
FIG. 7B is a diagram illustrating another example of an arrangement state of a power divider and a substrate including an air hole, according to various embodiments.
Figure 7B:
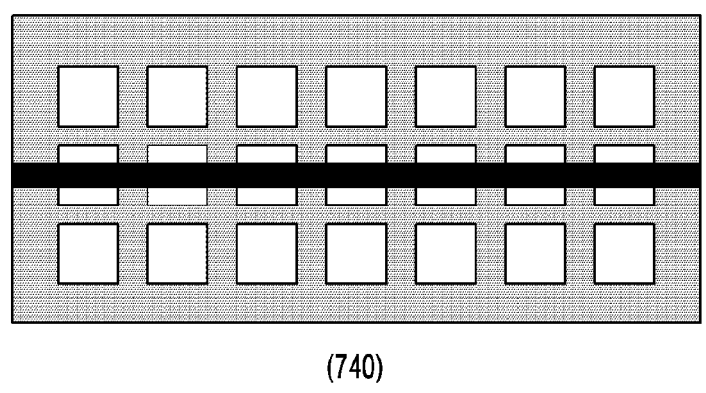
Figure 7C:
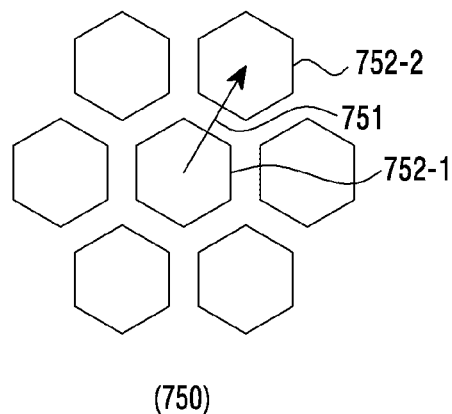
FIG. 7C is a diagram illustrating another example of an arrangement state of a power divider and a substrate including an air hole, according to various embodiments.
Figure 7C:
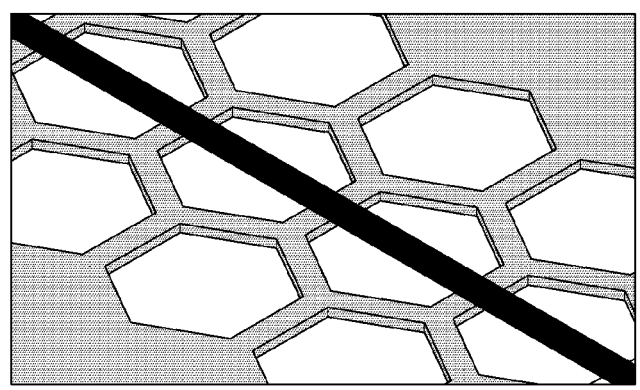
Figure 7D:
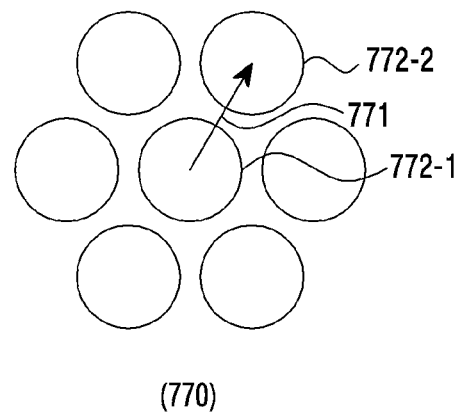
FIG. 7D is a diagram illustrating another example of an arrangement state of a power divider and a substrate including an air hole, according to various embodiments.
Figure 7D:
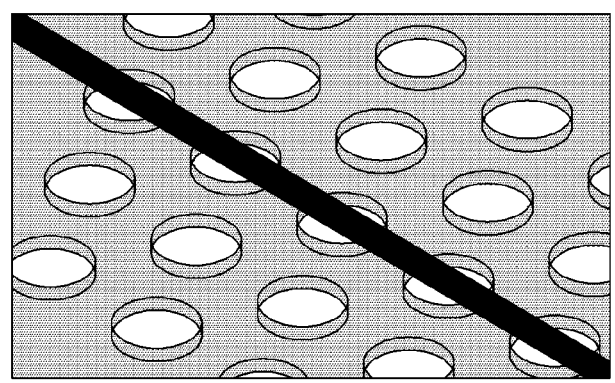

FIG. 7B is a diagram illustrating another example of an arrangement state of a power divider and a substrate including an air hole, according to various embodiments. In FIG. 7B, a transmission line arrangement for the air hole structure of FIG. 6A will be described as an example. In other words, the transmission line is disposed in a direction in which the same enters and exits from the center of the air hole structure through one point on one side of the air hole structure. However, the description of FIG. 7B is not limited to the example and may be equally applied to a transmission line arranged in a direction in which the same enters and exits from the center of the air hole structure through one vertex of the air hole structure disclosed in FIG. 6B. For convenience of description, the air hole structure is shown two dimensionally in FIG. 7B, but the air hole structure may be understood as a three-dimensional figure as shown in FIGS. 7C and 7D. That is, the air hole structure of FIG. 7B may be understood as a square pillar.

730 in the top of FIG. 7B shows an arrangement or wiring state of a transmission line 731 and a plurality of square air hole structures 732-1, 732-2 and 732-3 (which may be referred to as 732-1 to 732-3). Referring to 730, the transmission line 731 may be disposed to connect the center (e.g., a center of gravity) of a first air hole 732-1 to the centers of a second air hole 732-2 and a third air hole 732-3. In this case, the first air hole 732-1 may be a part of a path connected to a feeding point. According to an embodiment, the transmission line 731 may pass through one side of the second air hole 732-2 via one side of the first air hole 732-1 to be disposed to coincide with the center of the second air hole 732-2. According to an embodiment, the transmission line 731 may pass through one vertex of the second air hole 732-2 via one vertex of the first air hole 732-1 to be disposed to coincide with the center of the second air hole 732-2.

A substrate 740 including the structure indicated by 730 is shown in the bottom of FIG. 7B. A transmission line may be disposed on the substrate 740 including square air hole structures as described above. According to an embodiment, the distances between the air hole structures of the substrate 740 may be the same. For example, on the substrate 740, the distance between the center of the first air hole 742-1 and the center of the second air hole 742-2 may be the same as the distance between the center of the second air hole 742-2 and the center of the third air hole 742-3. Accordingly, the areas of regions where the dielectric region between the air holes overlap with the transmission line (e.g., a power divider) may be the same.

FIG. 7C is a diagram illustrating another example of an arrangement state of a power divider and a substrate including an air hole, according to various embodiments. In FIG. 7C, a transmission line arrangement for the air hole structure of FIG. 6A will be described as an example. In other words, the transmission line is disposed in a direction in which the same enters and exits from the center of the air hole structure through one point on one side of the air hole structure. However, the description of FIG. 7C is not limited to the example and may be equally applied to a transmission line arranged in a direction in which the same enters and exits from the center of the air hole structure through one vertex of the air hole structure disclosed in FIG. 6B.

750 in the top of FIG. 7C shows an arrangement or wiring state of a transmission line 751 and a plurality of regular hexagonal air hole structures 752-1 and 752-2. Referring to 750, the transmission line 751 may be disposed to connect the center (e.g., a center of gravity) of a first air hole 752-1 to the center of a second air hole 752-2. In this case, the first air hole 752-1 may be a part of a path connected to a feeding point. According to an embodiment, the transmission line 751 may pass through one side of the second air hole 752-2 via one side of the first air hole 752-1 to be disposed to coincide with the center of the second air hole 752-2. According to an embodiment, the transmission line 751 may pass through one vertex of the second air hole 752-2 via one vertex of the first air hole 752-1 to be disposed to coincide with the center of the second air hole 752-2.

A substrate 760 including the structure indicated by drawing 750 is shown in the bottom of FIG. 7C. A transmission line may be disposed on the substrate 760 including regular hexagonal air hole structures as described above. According to an embodiment, the distances between the air hole structures of the substrate 760 may be the same. For example, in drawing 750, the distance between the center of the first air hole 752-1 and the center of the second air hole 752-2 may be the same as the distance between the center of the second air hole 752-2 and the center of the third air hole 752-3. Accordingly, the areas of regions where the dielectric region between the air holes overlap with the transmission line (e.g., a power divider) may be the same. Here, another air hole may refer to an air hole adjacent to the second air hole 752-2. Another air hole may refer to an air hole disposed on the left side or an air hole disposed on the lower right side with respect to the second air hole 752-2 in 750.

FIG. 7D is a diagram illustrating another example of an arrangement state of a power divider and a substrate including an air hole, according to various embodiments. FIG. 7D shows an example in which the transmission line is arranged in the direction in which the same enters and exits from the center of a circular air hole structure.

770 in the top of FIG. 7D shows an arrangement or wiring state of a transmission line 771 and a plurality of circular air hole structures 772-1 and 772-3. Referring to 770, the transmission line 771 may be disposed to connect the center (e.g., a center of gravity) of a first air hole 772-1 to the center of a second air hole 772-2. In this case, the first air hole 772-1 may be a part of a path connected to a feeding point. According to an embodiment, the transmission line 771 may pass through one side of the second air hole 772-2 via one side of the first air hole 772-1 to be disposed to coincide with the center of the second air hole 772-2.

A substrate 780 including the structure indicated by 770 is shown in the bottom of FIG. 7D. A transmission line may be disposed on the substrate 780 including circular air hole structures as described above. According to an embodiment, the distances between the air hole structures of the substrate 780 may be the same. For example, in drawing 770, the distance between the center of the first air hole 772-1 and the center of the second air hole 772-2 may be the same as the distance between the center of the second air hole 772-2 and the center of another air hole. Accordingly, the areas of regions where the dielectric region between the air holes overlap with the transmission line (e.g., a power divider) may be the same. Another air hole may refer to an air hole adjacent to the second air hole 772-2. Another air hole may refer to an air hole disposed on the left side or an air hole disposed on the lower right side with respect to the second air hole 772-2 in drawing 770.

Considering the above, for the substrate including an air hole structure e.g., an air hole substrate) according to an embodiment of the disclosure, the degree of freedom may be determined based on a shape of the air hole. In other words, the degree of freedom for the arrangement of a transmission line may be determined based on a shape of an air holes and the number of air holes included in a substrate having the same area. In this case, the number of air holes included in the substrate having an equivalent area may also be determined based on a shape of the air holes. For example, in comparison between FIGS. 7C and 7D, since the substrate 760 of FIG. 7C includes regular hexagonal air holes, more air holes may be included in an equivalent area, whereas since the substrate 780 of FIG. 7D includes circular air holes, fewer air holes may be included in the equivalent area. This may be understood as the same principle in which an empty space is formed when a plurality of circles are arranged adjacent to each other, but no empty space is formed when a plurality of regular hexagons are arranged adjacent to each other. Accordingly, as the number of air holes formed in the substrate increases, the number of cases in which the transmission lines are disposed may increase, and thus the degree of freedom for the arrangement of a transmission line may be increased. In addition, as described in FIGS. 6A and 6B, a degree of freedom value for arranging a transmission line may vary depending on a shape (e.g., a regular triangle, a square, a regular hexagon, etc.) of an air hole, and accordingly, the degree of freedom for an arrangement of a transmission line may vary.

Referring to FIGS. 1 to 7D, the air layer substrate structure and the antenna structure including the same according to an embodiment of the disclosure can reduce production costs and improve the radiation performance of the antenna compared to the conventional substrate structure. For example, the air layer substrate structure and the antenna structure including the same according to an embodiment of the disclosure may reduce production costs using a dielectric substrate or a substrate including a dielectric layer. For another example, the air layer substrate structure and the antenna structure including the same according to an embodiment of the disclosure may include an air layer in a path where a power divider or a transmission line is disposed, and thus can improve the radiation performance by minimizing and/or reducing a loss, in contrast to a dielectric substrate structure that does not include an air layer. For example, the air hole substrate structure and the antenna structure including the same according to an embodiment of the disclosure can minimize and/or reduce the phase change of a signal according to the design rule between the power divider and the plurality of air holes described in FIGS. 6A and 6B. As a result of minimization or reduction of losses and phase changes, the air hole substrate structure and the antenna structure including the same according to an embodiment of the disclosure can reduce losses by about 35% to 50% compared to the conventional substrate (e.g., a PCB) and the dielectric substrate structure without an air hole.

The substrate including a plurality of support members or a plurality of air holes for forming an air layer and the antenna structure including the same have been described with reference to FIGS. 1 to 7D, but an MMU or mmWave device including a plurality of antenna elements, a power divider, and a substrate, which are combined in one device, may also be understood as an embodiment of the disclosure. Hereinafter, an example of an electronic device in which an air layer substrate structure and an antenna structure including the same according to an embodiment of the disclosure are mounted and implemented will be described in greater detail below with reference to FIG. 8.

Figure 8:
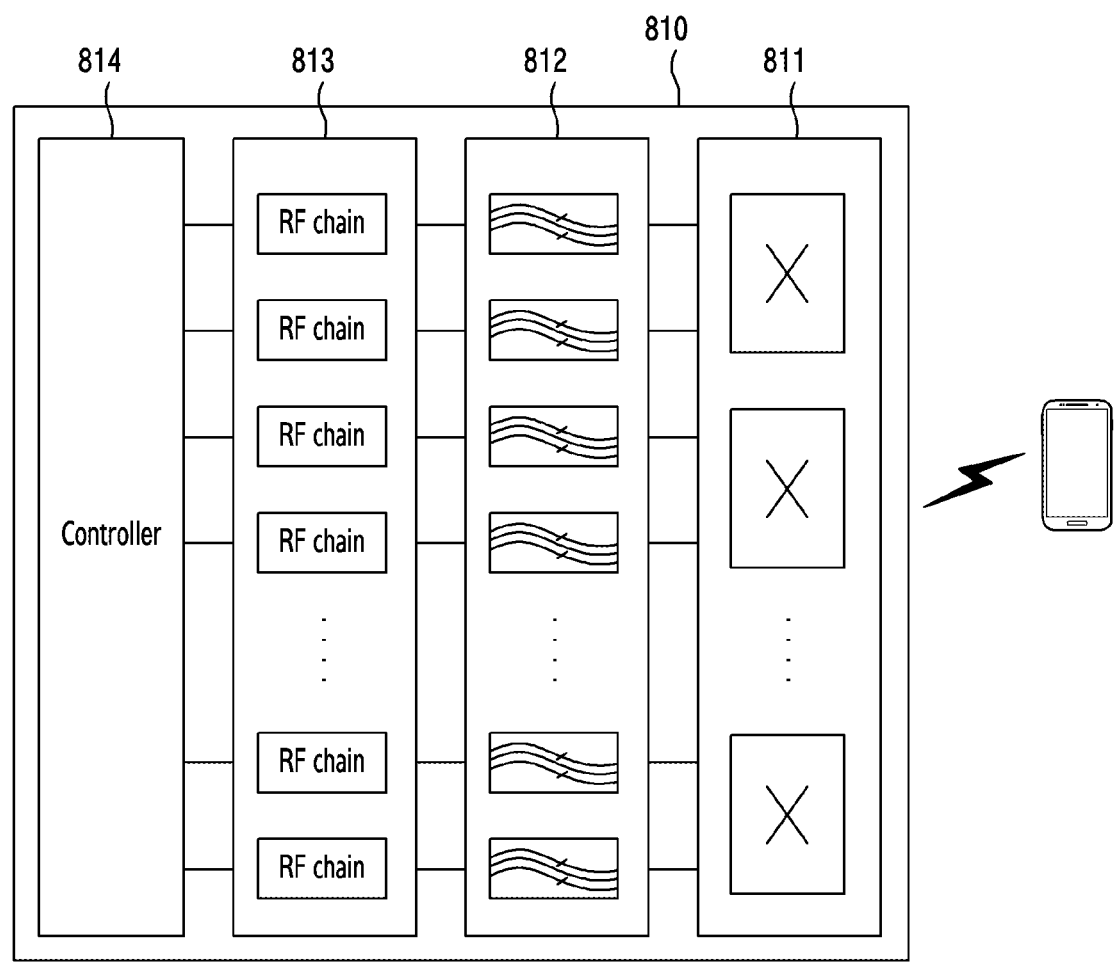
FIG. 8 is a block diagram illustrating an example configuration of an electronic device according to various embodiments.

FIG. 8 is a block diagram illustrating an example configuration of an electronic device according to various embodiments. The electronic device 810 may, for example, be either a base station or a terminal. According to an embodiment, the electronic device 810 may be an MMU or mmWave device. Embodiments of the disclosure may include not only the substrate structure mentioned through FIGS. 1 to 7D but also an antenna structure including the same and an electronic device including the same.

Referring to FIG. 8, a functional configuration of the electronic device 810 is illustrated as an example. The electronic device 810 may include an antenna unit (e.g., including at least one antenna) 811, a filter unit (e.g., including at least one filter) 812, a radio frequency (RF) processor (e.g., including various RF circuitry) 813, and a controller (e.g., including various processing circuitry) 814.

The antenna unit 811 may include at least one or a plurality of antennas. The antenna performs functions for transmitting and receiving signals through a wireless channel. The antennas may include a radiator formed of a conductive pattern or a conductor formed on a substrate (e.g., a PCB). The antennas may radiate an up-converted signal on a wireless channel or acquire a signal radiated by another device. Each antenna may be referred to as an antenna element or an antenna device. In various embodiments, the antenna unit 811 may include an antenna array (e.g., a sub array) in which a plurality of antenna elements form an array. The antenna unit 811 may be electrically connected to the filter unit 812 through RF signal lines. The antenna unit 811 may be mounted on a PCB including a plurality of antenna elements. The PCB may include a plurality of RF signal lines connecting each antenna element to a filter of the filter unit 812. The RF signal lines may be referred to as a feeding network. The antenna unit 811 may provide a received signal to the filter unit 812 or may radiate a signal provided from the filter unit 812 into the air.

The antenna unit 811 according to various embodiments may include at least one antenna module including a dual polarization antenna. The dual polarization antenna may be, for example, a cross-pole (x-pol) antenna. The dual polarization antenna may include two antenna elements corresponding to different polarizations. For example, the dual polarization antenna may include a first antenna element having a polarization of +45° and a second antenna element having a polarization of −45°. In addition to +45° and −45° polarizations, other orthogonal polarizations may be used. Each antenna element may be connected to a feeding line and may be electrically connected to the filter unit 812, the RF processor 813, and a controller 814, which are to be described in greater detail below.

According to an embodiment, the dual polarization antenna may be a patch antenna (or a microstrip antenna). The dual polarization antenna which has the shape of a patch antenna can be easily implemented and integrated into an array antenna. Two signals having different polarizations may be input to antenna ports, respectively. Each antenna port corresponds to an antenna element. The relationship between the co-pol characteristic and the cross-pol characteristic between two signals having different polarizations is required to be optimized for high efficiency. In the dual polarization antenna, the co-pole characteristic indicates a characteristic for a specific polarization component and the cross-pole characteristic indicates a characteristic for a polarization component different from the specific polarization component. An antenna element and a sub array (e.g., FIGS. 4A and 5) of an air layer substrate structure according to an embodiment of the disclosure may be included in the antenna unit 811 of FIG. 8.

The filter unit 812 may include at least one filter and perform filtering to transmit a signal in a desired frequency. The filter unit 812 may form resonance to perform a function for selectively identify frequencies. In some embodiments, the filter unit 812 may structurally form resonance through a cavity including a dielectric. In addition, in some embodiments, the filter unit 812 may form resonance through elements that form inductance or capacitance. In addition, in some embodiments, the filter unit 812 may include an elastic filter such as a bulk acoustic wave (BAW) filter or a surface acoustic wave (SAW) filter. The filter unit 812 may include at least one of a band pass filter, a low pass filter, a high pass filter, and a band reject filter. That is, the filter unit 812 may include RF circuits for obtaining signals in a frequency band for transmission or in a frequency band for reception. The filter unit 812 according to various embodiments may electrically connect the antenna unit 811 to the RF processor 813.

The RF processor 813 may include various RF circuitry and include a plurality of RF paths. The RF paths may be a unit of a path through which a signal received through an antenna or a signal radiated through an antenna passes. At least one RF path may be referred to as an RF chain. The RF chain may include a plurality of RF elements. The RF elements may include an amplifier, a mixer, an oscillator, a DAC, an ADC, and the like. For example, the RF processor 813 may include an up converter configured to up-convert a digital transmission signal in a base band to a transmission frequency, and a digital-to-analog converter (DAC) configured to convert the up-converted digital transmission signal into an analog RF transmission signal. The up converter and the DAC form a part of a transmit path. The transmit path may further include a power amplifier (PA) or a coupler (or a combiner). In addition, for example, the RF processor 813 may include an analog-to-digital converter (ADC) configured to convert an analog RF reception signal into a digital reception signal, and a down converter configured to convert the digital reception signal into a digital reception signal in a base band. The ADC and down converter form a part of receive path. The receive path may further include a low-noise amplifier (LNA) or a coupler (or a divider). RF components of the RF processor may be implemented on a PCB. The electronic device 810 may include a structure in which the antenna unit 811, the filter unit 812, and the RF processor 813 are sequentially stacked. The antennas and RF components of the RF processor may be implemented on a PCB, and filters may be repeatedly connected between a PCB and a PCB to form a plurality of layers.

The controller 814 may include various processing and/or control circuitry and control overall operations of the electronic device 810. The controller 814 may include various modules for performing communication. The controller 814 may include at least one processor such as a modem. The controller 814 may include modules for digital signal processing. For example, the controller 814 may include a modem. During data transmission, the controller 814 generates complex symbols by encoding and modulating the transmitted bit stream. In addition, for example, during data reception, the controller 814 restores a received bit stream by demodulating and decoding the baseband signal. The controller 814 may perform functions of a protocol stack required by a communication standard.

In FIG. 8, the functional configuration of the electronic device 810 has been described as equipment to which the antenna structure of the disclosure can be utilized. However, the example shown in FIG. 8 is only a configuration for the utilization of the air layer substrate structure and the antenna structure including the same according to various embodiments of the disclosure, described through FIGS. 1 to 7D, and the embodiments of the disclosure are not limited to the components of the equipment shown in FIG. 8. Accordingly, an air layer substrate structure (e.g., a substrate structure including a plurality of support members and a substrate structure including a plurality of air holes), an antenna structure including the substrate structure, and other type of communication equipment including the same, according to embodiments of the disclosure, may also be understood as embodiments of the disclosure.

According to an example embodiment of the disclosure, an antenna structure of a wireless communication system may include: at least one antenna element, a power divider configured to feed the at least one antenna element, and a substrate, the at least one antenna element and the power divider may be disposed on a first region of the substrate, the substrate may include a first dielectric layer having an air layer in a region corresponding to the first region, and a second dielectric layer disposed between the first dielectric layer and the power divider.

In an example embodiment, the first dielectric layer may further include a plurality of supports disposed in a region corresponding to the first region, and the plurality of supports may be disposed to be spaced apart from each other such that the air layer is formed between the plurality of supports and the supports may be formed of a dielectric material.

In an example embodiment, the plurality of supports may include a first support and a second support, and based on a first overlapping region being a region in which the power divider overlaps with the first support and a second overlapping region being a region in which the power divider overlaps with the second support, an area of the first overlapping region may be different from an area of the second overlapping region.

In an example embodiment, the first dielectric layer may further include a plurality of holes disposed in a region corresponding to the first region, and the air layer may be formed by the plurality of holes.

In an example embodiment, the plurality of holes may include a first hole, a second hole, and a third hole, and based on the first hole and the third hole being holes adjacent to the second hole, a distance between the center of the first hole and the center of the second hole may be equal to a distance between the center of the second hole and the center of the third hole.

In an example embodiment, each of the plurality of holes may be formed in at least one of a cylinder, a triangular prism, a square pillar, or a hexagonal pillar.

In an example embodiment, the power divider may be disposed to pass through a center of gravity of each of the plurality of holes.

In an example embodiment, each of the plurality of holes may be formed in a hexagonal pillar, the plurality of holes may include a first hole, and the power divider may be disposed to not pass through any vertex of the first hole.

In an example embodiment, each of the plurality of holes may be formed in a hexagonal pillar, the plurality of holes may include a first hole, and the power divider may be disposed to pass through two of the vertices of the first hole.

In an example embodiment, the second dielectric layer corresponding to a second region in which the plurality of holes are disposed in the first dielectric layer may include holes smaller than each of the plurality of holes.

According to an example embodiment, a massive multiple input multiple output (MIMO) unit (MMU) device may include: a main printed circuit board (PCB), a radio frequency integrated circuit (RFIC) disposed on the main PCB, an antenna PCB disposed on the main PCB, a plurality of antenna elements, and a power divider configured to feed the plurality of antenna elements, the plurality of antenna elements and the power divider may be disposed on the antenna PCB, and the antenna PCB may include a first dielectric layer having an air layer in a region corresponding to a first region in which the power divider is disposed on the antenna PCB, and the antenna PCB may include a second dielectric layer disposed between the first dielectric layer and the power divider.

In an example embodiment, the first dielectric layer may further include a plurality of supports disposed in a region corresponding to the first region, and the plurality of supports may be disposed to be spaced apart from each other wherein the air layer is formed between the plurality of supports and the supports may be formed of a dielectric material.

In an embodiment, the plurality of supports may include a first support and a second support, and an area of a first overlapping region in which the power divider overlaps the first support may be different from an area of a second overlapping region in which the power divider overlaps the second support.

In an example embodiment, the first dielectric layer may further include a plurality of holes disposed in a region corresponding to the first region, and the air layer may be formed by the plurality of holes.

In an example embodiment, the plurality of holes may include a first hole, a second hole, and a third hole, and based on the first hole and the third hole being holes adjacent to the second hole, a distance between a center of the first hole and a center of the second hole may be equal to a distance between a center of the second hole and the center of the third hole.

In an example embodiment, each of the plurality of holes may be formed in at least one of a cylinder, a triangular prism, a square pillar, or a hexagonal pillar.

In an example embodiment, the power divider may be disposed to pass through a center of gravity of each of the plurality of holes.

In an example embodiment, each of the plurality of holes may be formed in a hexagonal pillar, the plurality of holes may include a first hole, and the power divider may be disposed to not pass through any vertex of the first hole.

In an example embodiment, each of the plurality of holes may be formed in a hexagonal pillar, the plurality of holes may include a first hole, and the power divider may be disposed to pass through two of the vertices of the first hole.

In an example embodiment, the second dielectric layer corresponding to a second region in which the plurality of holes are disposed in the first dielectric layer may include holes smaller than each of the plurality of holes.

The methods according to various embodiments described in the claims or the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described example embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been illustrated and described with reference to various example embodiments, it will be understood that the various example embodiments are intended to be illustrative, not limiting. It will be further understood by those skilled in the art, that various modifications and changes may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An antenna device comprising:
    a substrate including a first dielectric layer and a second dielectric layer disposed on the first dielectric layer, wherein the first dielectric layer includes a first portion which is an air layer, and
    wherein the second dielectric layer includes a second portion overlapping with the first portion;
    at least one antenna element disposed on the substrate; and
    a feeding line configured to feed power to the at least one antenna element,
    wherein the feeding line is disposed on the second portion of the second dielectric layer to overlap with at least a portion of the first portion of the first dielectric layer.

2. The antenna device of claim 1, further comprising:
    a plurality of support members disposed in the first portion,
    wherein the plurality of support members are disposed to be spaced apart from each other, and comprise a dielectric material.

3. The antenna device of claim 2, wherein the plurality of support members comprise a first support member and a second support member,
    wherein a first region in which the feeding line and the first support member overlap has a first area, and
    wherein a second region in which the feeding line and the second support member overlap has a second area different from the first area.

4. The antenna device of claim 1, wherein the first portion corresponds to a plurality of holes formed in the first dielectric layer.

5. The antenna device of claim 4, wherein the plurality of holes comprise a first hole, a second hole, and a third hole,
    wherein the first hole and the third hole are adjacent to the second hole, and
    wherein a distance between a center of the first hole and a center of the second hole is equal to a distance between the center of the second hole and a center of the third hole.

6. The antenna device of claim 4, wherein each of the plurality of holes has a shape corresponding to at least one of a cylinder, a triangular prism, a square pillar, or a hexagonal pillar.

7. The antenna device of claim 4, wherein the plurality of holes comprises a first hole, and wherein the feeding line is disposed to pass through a center of gravity of the first hole.

8. The antenna device of claim 4, wherein each of the plurality of holes is formed in a hexagonal pillar, wherein the plurality of holes comprise a first hole, and wherein the feeding line is disposed to not pass through a vertex of the first hole.

9. The antenna device of claim 4, wherein each of the plurality of holes is formed in a hexagonal pillar, wherein the plurality of holes comprise a first hole, and wherein the feeding line is disposed to pass through two vertices of the first hole.

10. The antenna device of claim 4, wherein the second dielectric layer includes holes formed in the second portion and smaller than each of the plurality of holes formed in the first dielectric layer.

11. A massive multiple input multiple output (MIMO) unit (MMU) device comprising:
    a printed circuit board (PCB);
    a radio frequency integrated circuit (RFIC) disposed on the PCB;
    a substrate disposed on the PCB, wherein the substrate includes a first dielectric layer and a second dielectric layer disposed on the first dielectric layer, wherein the first dielectric layer includes a first portion which is an air layer, and wherein the second dielectric layer includes a second portion overlapping with the first portion;
    a plurality of antenna elements disposed on the substrate; and
    a feeding line configured to feed power to the plurality of antenna elements, wherein the feeding line is disposed on the second portion of the second dielectric layer to overlap with at least a portion of the first portion of the first dielectric layer.

12. The MMU device of claim 11, further comprising a plurality of support members disposed in and the first portion,
wherein the plurality of support members are disposed to be spaced apart from each other, and comprise a dielectric material.

13. The MMU device of claim 12, wherein the plurality of support members comprise a first support member and a second support member, and
wherein a first region in which the feeding line and the first support member overlap has a first area, and wherein a second region in which the feeding line and the second support member overlap has a second area different from the first area.

14. The MMU device of claim 11, wherein the first portion corresponds to a plurality of holes formed in the first dielectric layer.

15. The MMU device of claim 14, wherein the plurality of holes comprise a first hole, a second hole, and a third hole, and wherein the first hole and the third hole are adjacent to the second hole, and wherein a distance between a center of the first hole and a center of the second hole is equal to a distance between the center of the second hole and a center of the third hole.

16. The MMU device of claim 14, wherein each of the plurality of holes has a shape corresponding to at least one of a cylinder, a triangular prism, a square pillar, or a hexagonal pillar.

17. The MMU device of claim 14, wherein the plurality of holes comprises a first hole, and wherein the feeding line is disposed to pass through a center of gravity of the first hole.

18. The MMU device of claim 14, wherein each of the plurality of holes is formed in a hexagonal pillar, wherein the plurality of holes comprise a first hole, and wherein the feeding line is disposed to not pass through any vertex of the first hole.

19. The MMU device of claim 14, wherein each of the plurality of holes is formed in a hexagonal pillar, wherein the plurality of holes comprise a first hole, and wherein the power divider is disposed to pass through two vertices of the first hole.

20. The MMU device of claim 14, wherein the second dielectric layer includes holes formed in the second portion and smaller than each of the plurality of holes formed in the first dielectric layer.

* * * * *